Patented Mar. 8, 1949

2,463,561

UNITED STATES PATENT OFFICE 2,463,561

COMPOSITION FOR PATCHING METALLIC BODIES

Julian M. Riley, Parma, Ohio

No Drawing. Application July 9, 1947,
Serial No. 759,913

4 Claims. (Cl. 106—99)

This invention relates to a cement to be used for the purpose of patching cracks, perforations and larger holes in metallic or non-metallic bodies such as automobile fenders and bodies, vessels, containers, etc.

The primary object of the invention is the provision of a quick drying cement which is durable, cheap in production, readily and easily applied to fill cracks, perforations and larger holes in metallic and non-metallic bodies, unaffected by water and resistant to vibratory forces, which cement when in use does not change its volume.

Another object of the invention is the provision of a quick drying, waterproof cement of the type referred to above including a substantial amount of elongated, corrosion resisting metal fillings so as to increase the resistance of the cement against vibratory forces, increase its heat conducting properties, and permit metal to metal bond of the cement with a metal paste covering applied to the cement patch of an article to give such patch a proper, smooth surface necessary for a lacquer or synthetic finish.

Other and further objects of the invention will be apparent from the following description.

The composition cement comprising the present invention consists of the following ingredients in approximately the following proportions by weight:

| | Per cent |
|---|---|
| Plaster of Paris | 35 |
| Portland cement | 25 |
| Powdered alum | 5 |
| Powdered red lead or minium | 10 |
| Non-corrosive metal wool particles having a length of approximately ½ to 2 inches | 25 |

The above ingredients in the proportions noted are thoroughly mixed in the dry state with addition of coloring matter if desirable, and thus may be manufactured and distributed at a low cost. This composition when prepared by addition of water to a slightly flowing plastic state adheres with great tenacity to the material to which it is applied and is capable of withstanding great physical wear, mechanical vibrations and action of the elements.

The product which, as above noted, is manufactured in the dry state and distributed commercially in the same condition, is particularly well suited for repair and patching of metal bodies such as automobile fenders and bodies. When the compound is to be used, sufficient water is added to make a slightly flowing paste which then is applied to the place to be mended either by the use of a finger or a putty knife and hardens in about five to fifteen minutes sufficient to be worked by abrading tools and covered by a metal paste effecting a metal to metal contact of metal flakes of the metal paste with the protruding ends of metal wool particles of the cement. A paste particularly well suited for this purpose consists of the following ingredients in approximately the following proportions by weight:

| | Per cent |
|---|---|
| Powdered aluminum | 48.5 |
| Magnesium silicate | 24 |
| Polyvinyl plastic | 13.8 |
| Acetone | 13.7 |

Having thus described my invention:
What I claim is:

1. A waterproof cement for repair of metallic and non-metallic articles including the following ingredients:

| | Per cent |
|---|---|
| Plaster of Paris and Portland cement about | 60 |
| Powdered alum and powdered minium about | 15 |
| and Corrosion resisting metal wool particles having a length of about ½ to 2 inches | 25 |

2. A waterproof cement for repair of metallic and non-metallic articles including the following ingredients by weight:

| | Per cent |
|---|---|
| Plaster of Paris | 35 |
| Portland cement | 25 |
| Powdered alum | 5 |
| Powdered minium | 10 |
| and Corrosion resisting metal wool particles having a length of about ½ to 2 inches | 25 |

3. A waterproof cement for repair of metallic and non-metallic articles consisting of a dry mixture of substantially equal parts by weight of Portland cement, plaster of Paris and rustproofed steel wool particles of a length of about ½ to 2 inches and about one third of a part of powdered minium having some alum added thereto.

4. A waterproof cement for repair of metallic and non-metallic articles consisting of a dry mixture of the following ingredients by weight: a mixture of plaster of Paris and Portland cement about 60%; a mixture of powdered minium and powdered alum about 15%; and rustproofed steel wool particles of a length of about ½ to 2 inches about 25%.

JULIAN M. RILEY.

REFERENCES CITED

The following references are of record in the file of this patent:

UNITED STATES PATENTS

| Number | Name | Date |
|---|---|---|
| 1,186,217 | Mark | June 6, 1916 |
| 1,894,628 | Mortland | Jan. 17, 1933 |